(12) United States Patent
Kim et al.

(10) Patent No.: US 8,331,271 B2
(45) Date of Patent: Dec. 11, 2012

(54) RELAY STATION AND WIRELESS COMMUNICATION SYSTEM USING THE SAME

(75) Inventors: Byoung Hoon Kim, Anyang-si (KR); Jun Ho Jo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 12/467,702

(22) Filed: May 18, 2009

(65) Prior Publication Data

US 2010/0142417 A1 Jun. 10, 2010

Related U.S. Application Data

(60) Provisional application No. 61/077,133, filed on Jun. 30, 2008.

(30) Foreign Application Priority Data

Dec. 22, 2008 (KR) .................. 10-2008-0131321

(51) Int. Cl.
*H04B 3/36* (2006.01)

(52) U.S. Cl. ...................................... 370/293

(58) Field of Classification Search .......... 370/273–297; 178/70; 379/338; 455/7
See application file for complete search history.

(56) References Cited

U.S. PATENT DOCUMENTS

| | | | | |
|---|---|---|---|---|
| 5,583,915 | A * | 12/1996 | Ishida | 455/412.1 |
| 7,299,005 | B1 * | 11/2007 | Yarkosky et al. | 455/7 |
| 2001/0043572 | A1 | 11/2001 | Bilgic et al. | |
| 2003/0125067 | A1 * | 7/2003 | Takeda et al. | 455/522 |
| 2005/0025093 | A1 | 2/2005 | Yun et al. | |
| 2007/0086368 | A1 | 4/2007 | Lee et al. | |
| 2007/0217541 | A1 * | 9/2007 | Liu et al. | 375/279 |
| 2008/0043647 | A1 * | 2/2008 | Yoshida et al. | 370/280 |
| 2008/0247340 | A1 * | 10/2008 | Choi et al. | 370/281 |

FOREIGN PATENT DOCUMENTS

| | | |
|---|---|---|
| DE | 10 2004 039 674 A1 | 11/2005 |
| JP | 63-299529 A | 12/1988 |
| JP | 5-259956 A | 10/1993 |
| JP | 2001-189971 A | 7/2001 |
| JP | 2006/191649 A | 7/2006 |
| JP | 2007-505530 A | 3/2007 |
| WO | 2008/053895 A1 | 5/2008 |
| WO | 2008/056411 A1 | 5/2008 |

* cited by examiner

*Primary Examiner* — Mark Rinehart
*Assistant Examiner* — Mang Yeung
(74) *Attorney, Agent, or Firm* — Birch, Stewart, Kolasch & Birch, LLP

(57) ABSTRACT

A relay station, method and system operated in a frequency division duplex (FDD) are disclosed. The relay station is operated in a band switching FDD mode and/or a dual band transmit (Tx)/receive (Rx) mode. In the band switching FDD mode, Tx frequency and Rx frequency are switched. In the dual band Tx/Rx mode, concurrent transmission or concurrent reception is achieved in the Tx frequency and Rx frequency.

13 Claims, 15 Drawing Sheets

FIG. 13
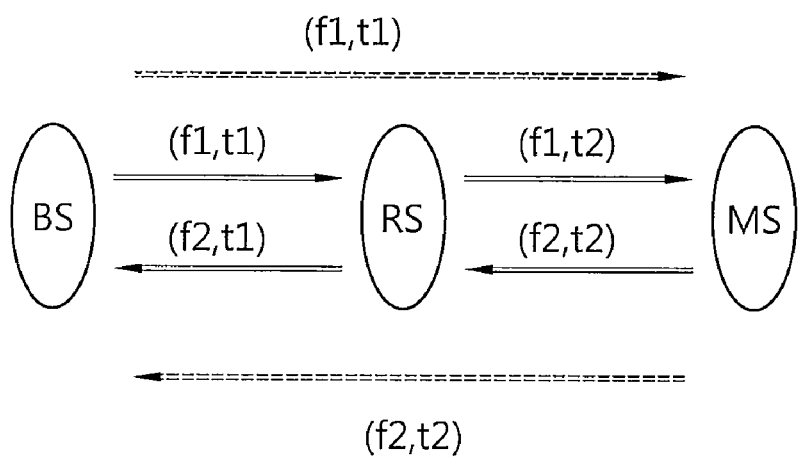
(a)
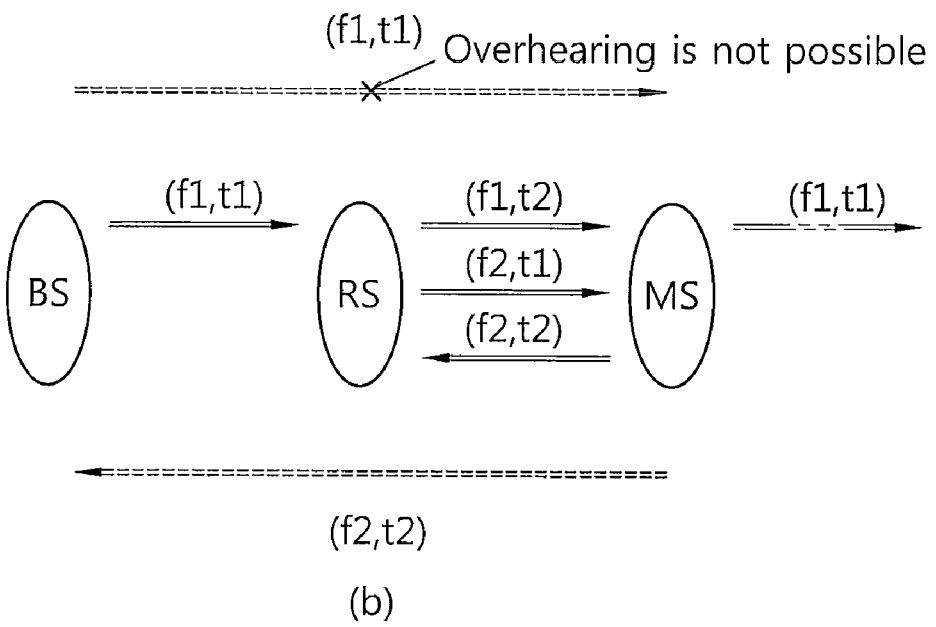
(b)

RELAY STATION AND WIRELESS COMMUNICATION SYSTEM USING THE SAME

CROSS-REFERENCE TO RELATED APPLICATIONS

This application claims the benefit of priority of U.S. Provisional application Ser. No. 61/077,133 filed on Jun. 30, 2008, and Korean Patent Application No. 10-2008-0131321 filed on Dec. 22, 2008, which are incorporated by reference in their entirety herein.

BACKGROUND OF THE INVENTION

1. Technical Field

The present invention relates to wireless communications, and more particularly, to operation of a relay station in a wireless communication system.

2. Related Art

Wireless communication systems are widely spread to provide various types of communication services. A wireless communication system may be a multiple access system capable of supporting communication with multiple users by sharing available system resources (i.e., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The wireless communication system typically includes a base station (BS) providing a service to a cell that is a specific region located around the BS. Conventionally, a mobile station (MS) can communicate with the BS when the MS is located within a cell. However, when an obstacle such as a building or the like exists or when the MS is at the cell edge, the MS may not be able to communicate with the BS or communication quality between the MS and the BS may degrade.

Several schemes have been proposed to extend the service coverage of the BS and to improve service quality at the cell edge. In one of the schemes, a relay station (RS) is employed in the wireless communication system. The RS relays communication between the BS and the MS (or between two MSs or between a MS/BS and another RS). Here, the RS delivers data between a BS and a MS through two-hop or multi-hop links other than a single direct link. The RS can extend the service coverage of the BS and can improve cell edge performance. In addition, the RS can also improve cell throughput.

Some RSs use a time division duplex (TDD) wireless communication system such as mobile WiMAX (e.g., the Institute of Electrical and Electronics Engineers (IEEE) 802.16j/m). Since a downlink phase and an uplink phase are periodically alternated in the TDD wireless communication system, a guard time is required between the two phases. In a TDD-mode relay, a downlink and uplink traffic ratio can be adaptively regulated by relatively changing the number of orthogonal frequency division multiplexing (OFDM) symbols assigned to each of downlink and uplink.

Some RSs use a frequency division duplex (FDD) wireless communication system. Examples of FDD wireless communication systems include an FDD-based $3^{rd}$ generation project partnership (GPP) long term evolution (LTE) system, a mobile WiMAX system supporting FDD, etc., which is for exemplary purposes only. Notably, an FDD-mode relay does not require a guard time between downlink and uplink, and interference between downlink transmission and uplink transmission less occurs in the FDD-mode relay than the TDD-mode relay.

In the conventional TDD wireless communication system, the TDD-mode relay is made possible by adding an RS having a transceiver of a legacy TDD station to the conventional system. This is because the TDD wireless communication system allows each station (i.e., BS, MS, and RS) to use all frequency bands at a time assigned for downlink or uplink. However, in the conventional FDD wireless communication system, it is difficult to operate normally when a system consisting of the conventional BS and the conventional MS is added to an RS having a transceiver compatible with the legacy TDD station or the legacy FDD station. This is because a full frequency band is divided into a downlink frequency hand and an uplink frequency band in the FDD wireless communication system. Therefore, there is a need for a new station for the FDD wireless communication system, a structure of the system, and a method of effectively using radio resources in the FDD wireless communication system.

SUMMARY OF THE INVENTION

The present invention provides a method and apparatus of improving the efficiency of radio resource usage in a wireless communication system.

The present invention also provides a method and apparatus of improving the efficiency of radio resource usage in a frequency division duplex (FDD) wireless communication system.

The present invention also provides a method and apparatus of supporting various communication scenarios for a base station (BS)-relay station (RS) link and an RS-mobile station (MS) link required.

In an aspect, there is a wireless communication system configured to operate in a frequency division duplex (FDD) mode in which a transmit (Tx) frequency and a receive (Rx) frequency are switched between a first frequency band and a second frequency band. The wireless communication system includes a relay station (RS), a first station configured to transmit a first signal in the first frequency band via the RS operating in the band switching FDD mode, receive a second signal in the second frequency band via the RS, and communicate in a half duplex mode or a full duplex mode, and a second station configured to receive the first signal in the first frequency band via the RS, transmit the second signal in the second frequency band via the RS, and communicate in the half duplex mode or the full duplex mode.

The band switching FDD mode includes switching multiplexing schemes when different multiplexing schemes are used in the first frequency band and the second frequency band.

The RS may be further configured to operate in a dual band transmit (Tx)/receive (Rx) mode in which concurrent signal transmissions or concurrent signal receptions occur in the first frequency band or the second frequency band.

The second station may be configured to directly receive the first signal, and to combine the relayed first signal with the directly received first signal.

The first station may be configured to directly receive the second signal, and to combine the relayed second signal with the directly received second signal.

The first station may be a base station (BS) and the second station may be a mobile station (MS).

The first station may be a MS and the second station may be a BS.

In another aspect, there is a relay station for wirelessly relaying communication between a source station and a destination station. The relay station includes a transceiver configured to operate in a band switching FDD mode or a dual band Tx/Rx mode. In the band switching FDD mode, a transmit (Tx) frequency and a receive (Rx) frequency are switched between a first frequency band and a second frequency band. In the dual band Tx/Rx mode, concurrent transmission or concurrent reception is achieved in the first frequency band or the second frequency band.

The transceiver may be configured to operate based on the band switching FDD mode and the dual band Tx/Rx mode.

The transceiver may be configured to change operation modes from the band switching FDD mode to the dual band Tx/Rx mode or from the dual band Tx/Rx mode to the band switching FDD mode.

The source station may be a BS and the destination station may be a MS.

The source station may be a MS and the destination station may be a BS.

At least one of the source station and the destination station may be configured to support the band switching FDD mode or the dual band Tx/Rx mode.

The first frequency band and the second frequency band may be different frequency bands.

In still another aspect, there is a method of relaying information via a relay station in a wireless communication system. The method includes: receiving a first signal in a first frequency band from a source station; relaying a second signal in a second frequency band to a destination station; and switching the first frequency band to the second frequency band used to relay the second signal to the destination station or switching the second frequency band to the first frequency band used to receive the first signal from the source station.

In still another aspect, there is a wireless communication device configured to operate in a frequency division duplex (FDD) mode in which a transmit (Tx) frequency and a receive (Rx) frequency are switched between a first frequency band and a second frequency band. The device includes a transceiver including a processor, the processor configured to cause the transceiver to transmit a first signal in the first frequency band via a relay station (RS) operating in the band switching FDD mode, receive a second signal in the second frequency band via the RS, and communicate in a half duplex mode or a full duplex mode.

In still another aspect, there is a wireless communication device configured to operate in a frequency division duplex (FDD) mode in which a transmit (Tx) frequency and a receive (Rx) frequency are switched between a first frequency band and a second frequency band. The device includes a transceiver including a processor, the processor configured to cause the transceiver to receive a first signal in a first frequency band via a relay station (RS), transmit a second signal in a second frequency band via the RS, and communicate in a half duplex mode or a full duplex mode.

The above described systems, methods and techniques can be used to support communication based on various possible scenarios in a frequency division duplex (FDD) wireless communication system. For example, not only can concurrent transmission or concurrent reception using a downlink frequency band and an uplink frequency band be achieved, but also communication can be achieved with respect to only a super-ordinate station or a sub-ordinate station by using a plurality of channels. In addition, a relay operation can be adaptively performed while changing an operation mode and/ or a relay mode according to an amount of downlink and uplink traffic or a state of base station-relay station and relay station-mobile station links.

BRIEF DESCRIPTION OF THE DRAWINGS

FIG. 13 shows an example of operating a resource exchange FDD system supporting MIMO.

DESCRIPTION OF EXEMPLARY EMBODIMENTS

A wireless communication system according to an embodiment of the invention may include a source station, one or more relay stations (RSs), and one or more destination stations. The RS may, for example, extend the range or coverage area and/or capacity of the source station by receiving and forwarding data between the source station and the one or more destination stations. The wireless communication system may include one "hop," in which the one or more RSs receive and forward the data directly to and from the parent station and destination station, or multiple hops, in which the RSs may receive the data from and/or forward the data to other RSs in the wireless communication system.

A mobile station (MS) according to an embodiment of the invention may be fixed or mobile, and may be referred to as another terminology, such as a user equipment (UE) a user terminal (UT), a subscriber station (SS), a wireless device, a personal digital assistant (PDA), a wireless modem, a handheld device, etc. A base station (BS) is generally a fixed station that communicates with the MS and may be referred to as another terminology, such as an evolved node-B (eNB), a base transceiver system (BTS), an access point, etc. A downlink (DL) is a communication link from the BS to the MS, and an uplink is a communication link from the MS to the BS. In the downlink, a transmitter may be a part of the BS, and a receiver may be a part of the MS. In the uplink, the transmitter may be a part of the MS, and the receiver may be a part of the BS.

For clarity, the embodiments to be described herein will focus on a case where a RS relays communication between a BS and a MS. In a downlink (DL) transmission, a BS is a source station and a MS is a destination station. In an uplink (UL) transmission, a MS is a source station and a BS is a destination station. Although the RS relays communication between the BS and the MS, this is for exemplary purposes only, and thus, unless otherwise specified, the present invention should not be construed as limited to the embodiments set forth herein. The following embodiments of the present invention can also apply to various types of relays, e.g., when the RS relays communication between other RSs or between a plurality of MSs, when the RS relays communication between another RS and the MS, when the RS relays communication between the BS and another RS, etc.

Figure 1:
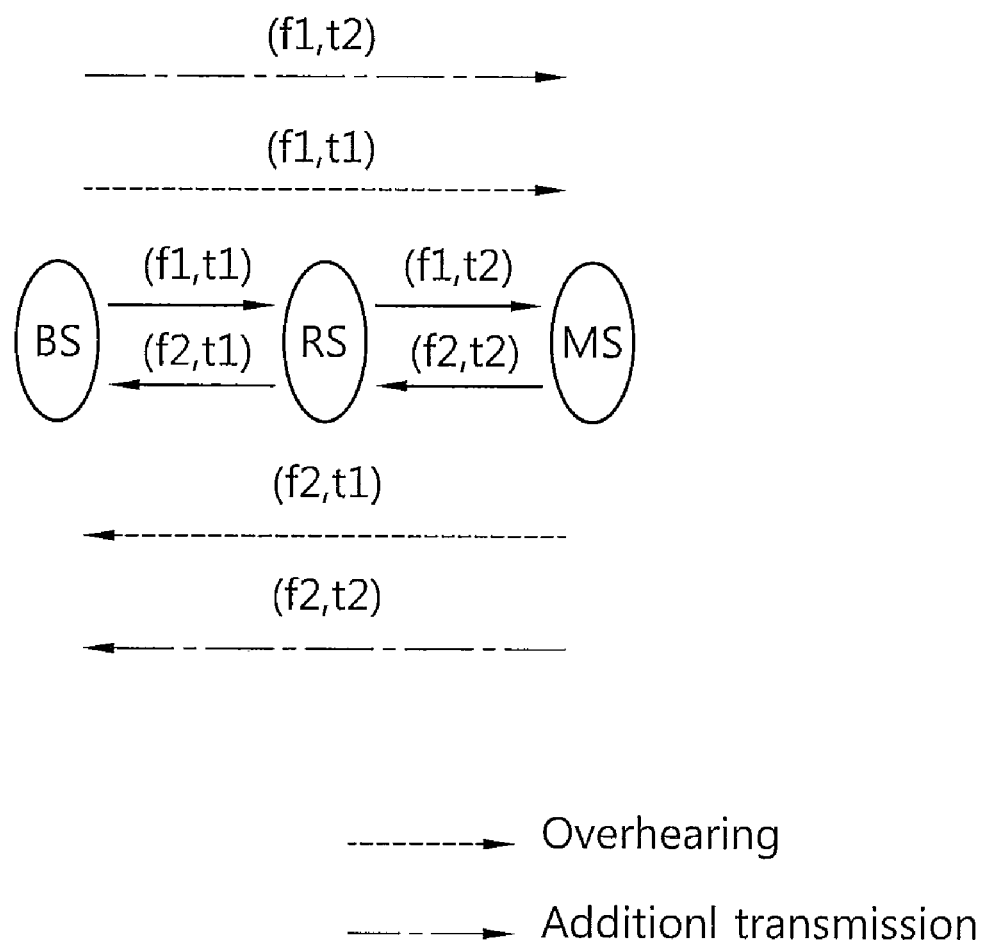
FIG. 1 shows a structure of a frequency division duplex (FDD) wireless communication system for implementing an embodiment of the present invention.

FIG. 1 shows a structure of a frequency division duplex (FDD) wireless communication system for implementing an embodiment of the present invention. A FDD wireless communication system may include a BS, an RS, and an MS. The BS and the MS support operations based on a full duplex FDD mode and/or a half duplex FDD mode. The full duplex FDD mode is a mode in which an operation can be performed in a transmit (Tx) mode and a receive (Rx) mode at different frequencies at the same time. The half duplex FDD mode is a mode in which the operation can be performed in the Tx mode and the Rx mode at different frequencies at different times rather than at the same time. Although it will be described that the BS and the MS support only the full duplex FDD mode in the embodiment to be described below, it is apparent to those skilled in the art that the present invention can also apply when the BS and the MS support the half duplex FDD mode (however, channel cross talk may exist or additional transmissions may be limited in the half duplex FDD mode).

The BS operating in the full duplex FDD mode can transmit a signal to the RS on a first frequency band f1 and at the same time can receive a signal from the RS on a second frequency band f2. The first frequency band f1 is a downlink (DL) frequency band and the second frequency band f2 is an uplink (UL) frequency band. The MS operating in the full duplex FDD mode can receive a signal from the RS on the first frequency band f1 and at the same time can transmit a signal to the RS on the second frequency band f2. Even if the BS or the MS operates in the full duplex FDD mode, transmission and reception do not have to be simultaneously performed at an instance of time, and thus only one of transmission and reception can be performed if necessary.

The RS may support not only the full duplex FDD mode but also a band switching FDD mode. The band switching FDD mode is a mode in which a Tx band and an Rx band can be switched. When a multiplexing mode is different in downlink and uplink (e.g., in case of using a single carrier frequency division multiple access (SC-FDMA) in uplink and using an orthogonal frequency division multiple access (OFDMA) in downlink), the band switching includes switching of the multiplexing mode. The RS supporting the full duplex FDD mode and the band switching FDD mode may simultaneously perform transmission and reception with respect to the BS at a specific time slot, and may perform transmission and reception with respect to the MS at another time slot.

Referring to FIG. 1, at a first time slot t1, communication is achieved between the BS and the RS. At the first time slot t1, the RS receives a signal from the BS in the first frequency band f1 and transmits a signal to the BS in the second frequency band f2. At a second time slot t2, communication is achieved between the RS and the MS. At the second time slot t2, the RS transmits a signal to the MS in the first frequency band f1 and receives a signal from the MS in the second frequency band f2. Consequently, communication between the BS and the MS is achieved in two time slots t1 and t2 (i.e., (f1, t1), (f1, t2) or (f2, t2), (f2, t1)).

Efficiency of wireless communication can be improved when the MS is located within a cell coverage of the BS. The MS can overhear a signal transmitted from the BS to the RS in the first frequency band f1 at the first time slot t1, and the BS can overhear a signal transmitted from the MS to the RS in the second frequency band f2 at the second time slot t2. Since the signal overheard by the MS or the BS is a signal to be transmitted from the RS to the MS or BS at a subsequent time slot, the overheard signal may be used to reproduce a signal received by the MS or BS from the RS at the subsequent time slot.

The MS can perform an additional transmission in which a signal is transmitted to the BS in the second frequency band f2 at the first time slot t1. Another additional transmission may be achieved when the BS transmits a signal to the MS on the first frequency band f1 at the second time slot t2. The signal transmitted by the MS (or BS) may be identical to or different from a signal transmitted by the RS to the BS (or MS) at the first time slot t1 (or the second time slot t2). The former is a case where the RS has a plurality of Rx antennas and uses spatial multiplexing, and the latter is a case of using resource partitioning of radio resources.

Figure 2:
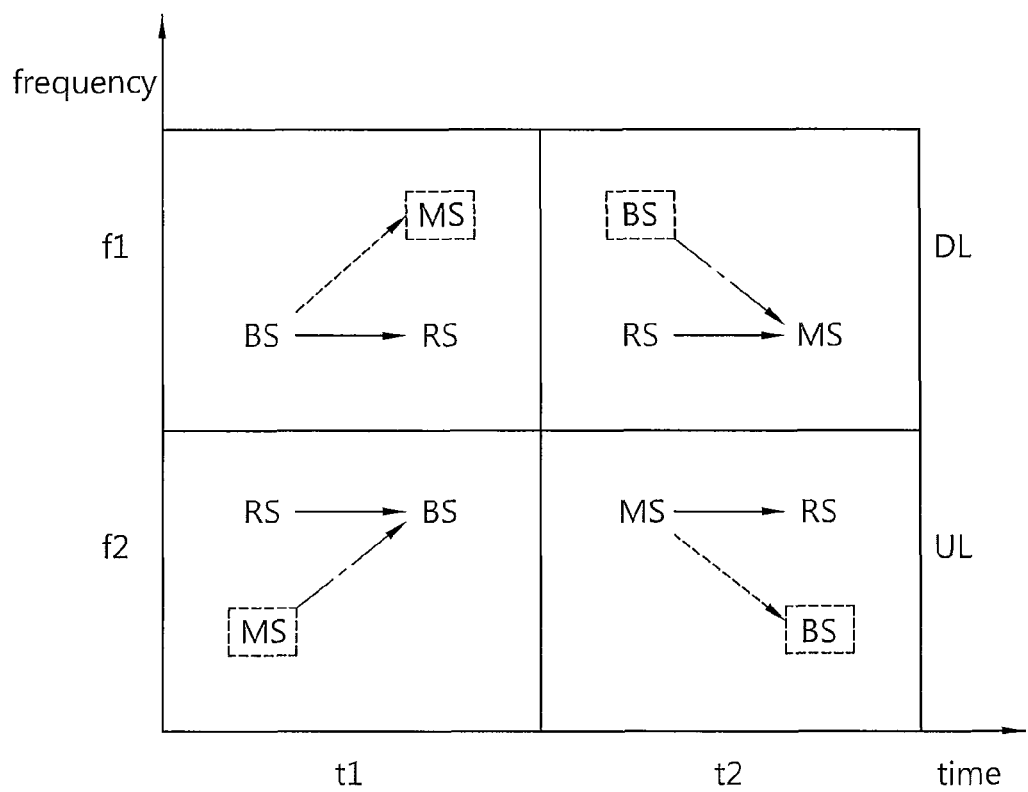
FIG. 2 shows an example of a frame structure used in a wireless communication system.

FIG. 2 shows an example of a frame structure used in a wireless communication system. The wireless communication system includes a band switching FDD RS and may be referred to as a band switching FDD system. A MS is located within a cell coverage of a BS. In the band switching FDD system, a DL frequency band f1 and an UL frequency band f2 are separated, and each of the UL and DL transmissions may use identical or different multiplexing schemes. Although it is assumed that OFDMA is used in DL and SC-FDMA is used in UL, this is for exemplary purposes only.

Referring to FIG. 2, at a first time slot t1, the BS transmits a DL signal to the RS in the DL frequency band f1, and/or the RS transmits a relay UL signal to the BS in the UL frequency band f2. The DL signal transmitted by the BS to the RS can be overheard by the MS. When the RS transmits the relay UL signal to the BS, the MS can transmit different data or identical data to the BS in the DL frequency band f2 by using resource partitioning or overlapping.

At a second time slot t2, the RS transmits a relay DL signal to the MS in the DL frequency band f1, and the MS transmits a UL signal to the RS on the UL frequency band f2. When the RS transmits the relay DL signal to the MS, the BS can also transmit different data or identical data to the MS in the DL frequency band f1 by using resource partitioning or overlapping, and the UL signal transmitted by the MS to the RS can also be overheard by the BS in the UL frequency band 12.

Diversity may be improved through a band switching FDD mode operation, but the efficiency of radio resources is not significantly improved due to an occasionally generated latency. The latency implies that a required time is longer than a minimum time that is theoretically expected.

For example, it is assumed that each of the BS and the MS intends to exchange a burst via the RS. A burst is a unit of data transmission during a time slot. In the case of a time division duplex (TDD) wireless communication system, four time slots are required when a single DL burst and a single UL burst are exchanged between the BS and the MS. In the case of the full duplex FDD system, the exchange can be completed by spending only two time slots. However, as will be described below, in the proposed FDD wireless communication system, three time slots are required to complete the exchange. In addition, after the three time slots, the MS and the BS can further receive and/or transmit bursts up to four times.

Figure 3:
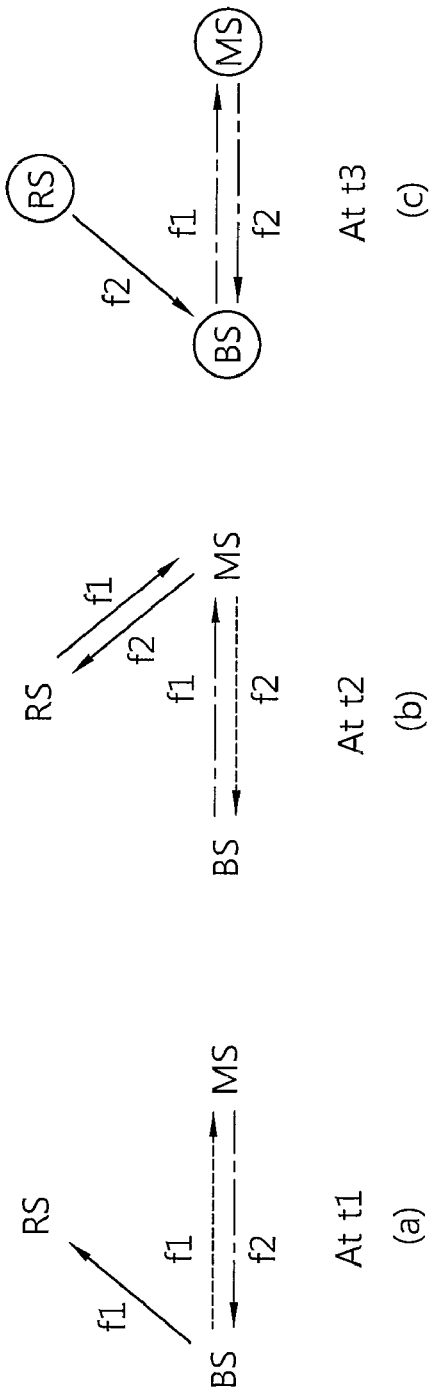
FIG. 3 shows an example of exchanging bursts via an RS in band switching FDD system.

FIG. 3 shows an example of exchanging bursts via an RS in band switching FDD system. Sub-figures (a), (b), and (c) of FIG. 3 show transmissions at time slots t1, t2, and t3, respectively.

At the time slot t1, the BS transmits a first burst to the RS in a first frequency band f1. The MS may overhear the first burst. Additional transmissions may also be performed. The MS may transmit a second bust to the BS in a second frequency f2.

At the time t2, the RS relays the first burst to the MS in the first frequency band f1, and receives the second burst from the MS in the second frequency band 12. The BS can overhear the second bust in the second frequency band f2. The BS may combine the overheard second burst with the second burst received at the previous time slot t1 in order to decode the second burst. At the same time, the MS may receive the first burst additionally transmitted from the BS in the first frequency band f1. The MS may use at least one of the additional first burst, the first burst relayed by the RS, the overheard first burst and their combination in order to decode the first burst.

At the time slot t3, the RS relays the second burst to the BS on the second frequency band f2. The BS may use at least one of the second burst relayed by the RS, the overheard first burst at time slot t2, the second burst additionally received at time slot t1 and their combination in order to decode the second burst. At the same time, the MS may receive the first burst additionally transmitted from the BS in the first frequency band f1. The MS may use at least one of the additional first burst received at time slot t3, the additional first burst received at time slot t2, the first burst relayed by the RS at time slot t2, the overheard first burst at time slot t1 and their combination in order to decode the first burst.

Spatial diversity and time diversity can also be used so that gain combining can be obtained. With one or more of the previously described techniques, reliability of DL transmission and UL transmission can be enhanced. When a destination station employs a plurality of Rx antennas, no additional resources are required. In order to estimate channels between a source station and a destination station and/or channels between a RS and a destination station, orthogonal resources for pilot transmission may be allocated at the second time slot t2 and the third time slot t3.

Figure 4:
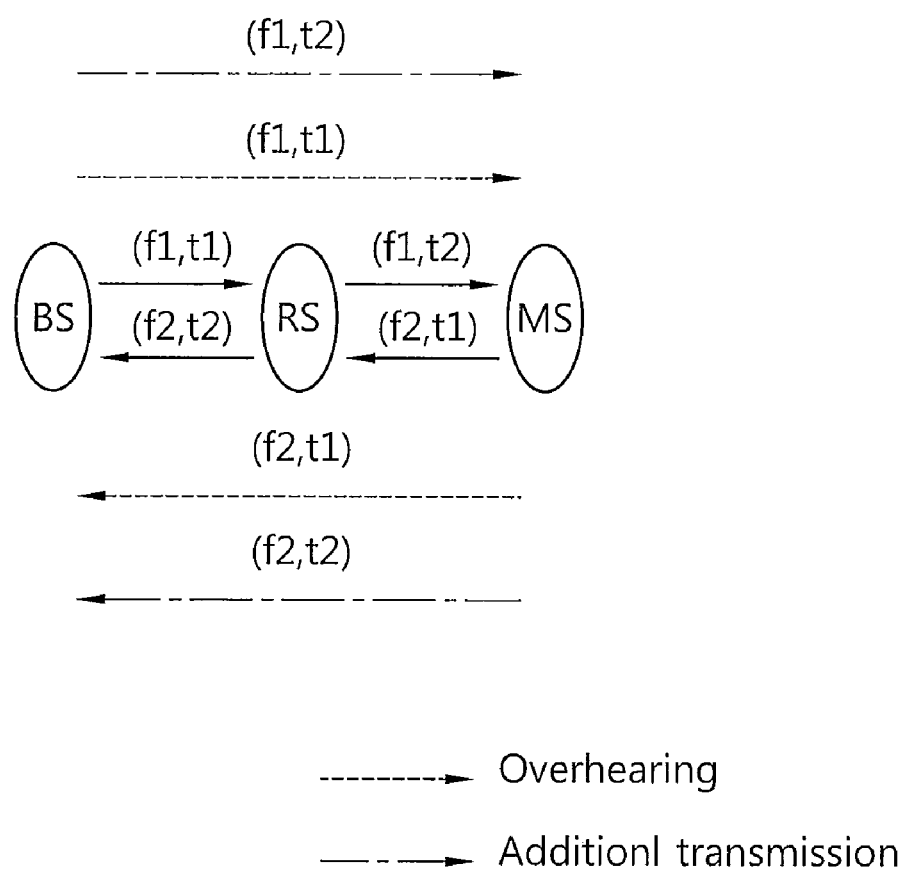
FIG. 4 shows a structure of a FDD wireless communication system for implementing another embodiment of the present invention.

FIG. 4 shows a structure of a FDD wireless communication system for implementing another embodiment of the present invention. The FDD wireless communication system of this embodiment may include a BS, an RS, and an MS. The BS and the MS support operations based on the full duplex FDD mode or the half duplex FDD mode. Although it will be described that the BS and the MS support only the full duplex FDD mode in the embodiment to be described below, it is apparent to those skilled in the art that the present invention can also apply when the BS and the MS support the half duplex FDD mode.

The RS may support not only the full duplex FDD mode but also a dual band Tx/Rx mode. The dual band Tx/Rx mode is a mode in which only concurrent transmission (or reception) is performed using two bands. The dual band Tx/Rx mode enables both transmission and reception at each frequency band, and thus includes switching of a multiplexing mode when the multiplexing mode is different in downlink and uplink (e.g., in case of using an SC-FDMA in uplink and using an OFDMA in downlink). The RS supporting the full duplex FDD mode and dual band Tx/Rx mode may perform only transmission with respect to the BS and the MS at a specific time slot, and may perform only reception with respect to the MS at another time slot.

Referring to FIG. 4, at a first time t1, the RS receives data from the BS and the MS. More specifically, at the first time t1, the RS receives a DL signal from the BS in a first frequency band f1 and receives a UL signal from the MS in a second frequency band f2. At a second time slot t2, the RS relays data to the BS and the MS. More specifically, at the second time t2, the RS relays the DL signal to the MS in the first frequency band f1 and relays the UL signal to the BS in the second frequency band f2. Consequently, communication between the BS and the MS is achieved in two time slots t1 and t2 (i.e., (f1, t1), (f1, t2) or (f2, t1), (f2, t2)).

Efficiency of wireless communication can be improved when the MS is located within a cell coverage of the BS. The MS can overhear the DL signal transmitted from the BS to the RS in the first frequency band f1 at the first time slot t1, and the BS can also overhear the UL signal transmitted from the MS to the RS in the second frequency band 12 at the first time slot t1. Since the DL signal overheard by the MS or the BS is a signal to be transmitted from the RS to the MS or BS at a subsequent time slot, the overheard signal may be used to reproduce a signal received by the MS or BS from the RS at the subsequent time slot.

The MS can perform an additional transmission in which a signal is transmitted to the BS on the second frequency band f2 at the second time slot t2. In addition, the BS can also perform an additional transmission in which a signal is transmitted to the MS on the first frequency band f1 at the second time slot t2. The additionally transmitted signal may be identical to or different from a signal transmitted by the RS to the MS or the BS at the second time slot t2. The former is a case where a destination station has a plurality of Rx antennas and uses spatial multiplexing, and the latter is a case of using resource partitioning of radio resources. The additional transmission may be achieved when the MS and/or the BS transmit signals to the BS and/or the MS at the second time slot t2 respectively on the first frequency band f1 and/or the second frequency band f2.

Figure 5:
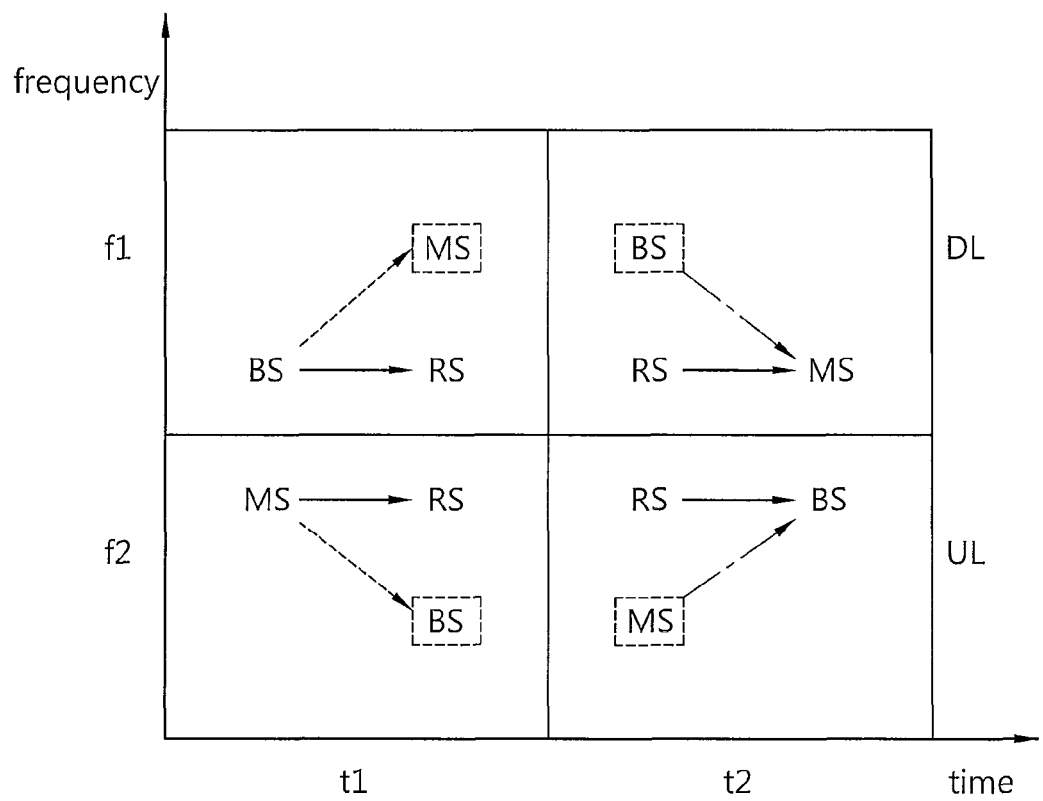
FIG. 5 shows an example of frame structure used in a wireless communication system.

FIG. 5 shows an example of frame structure used in a wireless communication system. The wireless communication system includes the dual band Tx/Rx FDD RS of FIG. 4 and may be referred to as a dual band Tx/Rx FDD system. A MS is located within a cell coverage of a BS. In the dual band Tx/Rx FDD system, a DL frequency band f1 and an UL frequency band f2 are separated, and each of UL and DL transmission may use identical or different multiplexing schemes. Although OFDMA is used in DL and SC-FDMA is used in UL, this is for exemplary purposes only.

Referring to FIG. 5, at a first time slot t1, the BS transmits a DL signal to the RS in the DL frequency band f1, and the MS transmits a UL signal to the RS in the UL frequency band f2. The DL signal transmitted by the BS to the RS can also be overheard by the MS, and the UL signal transmitted by the MS to the RS can also be overheard by the BS. At a second time slot t2, the RS relays the DL signal to the MS on the DL frequency band f1, and relays the UL signal to the BS in the UL frequency band 12. When the BS transmits the DL signal to the MS and/or when the RS relays the UL signal to the BS, the BS and/or the MS can also transmit different signal or identical signal to the MS and/or the BS in the DL frequency band f1 and/or the UL frequency band 12 by using resource partitioning or overlapping.

Diversity gain can be obtained through the dual band Tx/Rx mode operation, and latency can be minimized. As described above, when each of the BS and the MS intends to exchange bursts via the RS, in case of the full duplex FDD system, theoretically, the exchange needs to be completed by spending only two time slots. However, in case of the duplex Tx/Rx FDD system of the present embodiment, a DL burst and a UL burst can be exchanged in two time slots.

Figure 6:
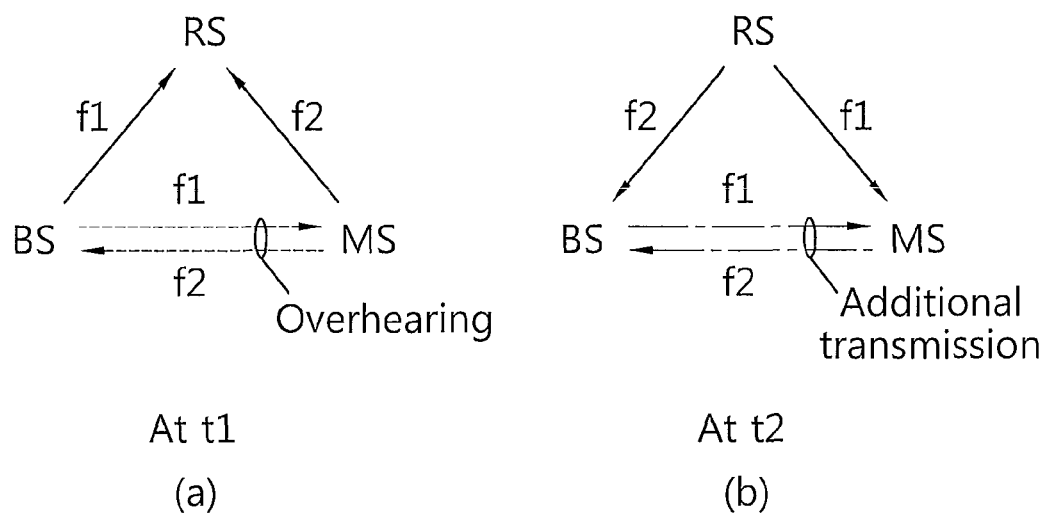
FIG. 6 shows an example of exchanging bursts via an RS in dual band Tx/Rx FDD system.

FIG. 6 shows an example of exchanging bursts via an RS in dual band Tx/Rx FDD system. The sub-figures (a) and (b) of FIG. 6 show transmissions at time slots t1, and t2, respectively.

At a time slot t1, a BS transmits a first burst to a RS in a DL frequency band f1. The MS can overhear the first burst. In addition, the MS also transmits a second burst to the RS in a UL frequency band f2. The BS also can overhear the second burst.

At a time slot t2, the RS relays the first burst in the DL frequency band f1, and relays the second burst to the BS in the UL frequency band f2. The BS and the MS can perform additional transmission with respect to the MS and the BS in the DL frequency band f1 and the UL frequency band 12, respectively. The MS may use at least one of the first burst relayed by the RS, the additional first burst, the overheard first burst at time slot t1 and their combination in order to decode the first burst. The BS may use at least one of the second burst relayed by the RS, the additional second burst, the overheard second burst at time slot t2 and their combination in order to decode the second burst.

Spatial diversity and time diversity can be utilized so that gain combining can be obtained. Reliability of DL transmission and UL transmission can be enhanced. When a destination station employs a plurality of Rx antennas, no additional resources are required. In order to estimate channels between a source station and a destination station and/or channels between a RS and a destination station, orthogonal resources for pilot transmission may be allocated at the second time slot t2.

Hereinafter, a FDD wireless communication system in which a RS, a BS and a MS support the UL/DL resource exchange is referred to as a 'resource exchange FDD system', which will be described below in detail. The RS and the MS support UL/DL resource exchange and may be known as local stations of the resource exchange FDD system.

The local stations of the resource exchange FDD system may support identical or different multi-band communication modes. For example, the RS and the MS may support a band switching FDD mode or a dual band Tx/Rx mode. Alternatively, the RS may support both the band switching FDD mode and the dual band Tx/Rx mode but the MS may support only the dual band Tx/Rx mode.

The local stations of the resource exchange FDD system may switch a DL frequency band and a UL frequency band if necessary. In a normal state, the RS and the MS use a first frequency band f1 as a DL frequency band and use a second frequency band f2 in a UL frequency band, whereas if necessary, according to a channel (i.e., BS-RS link and/or RS-MS link) state and/or a DL/UL traffic load, the RS and the MS may use the second frequency band f2 as DL frequency band and use the first frequency band f1 in UL frequency band.

It is assumed that the BS (also known as a global station of the resource exchange FDD system) uses fixed UL/DL frequency band. The BS may not support a UL/DL resource exchange. This is because, when the BS changes a UL/DL resource, the change affects all users within a corresponding cell, resulting in other complex problems that may outweigh any gain obtained by the UL/DL resource exchange. In this situation, the BS uses the first frequency band f1 as DL frequency band and uses the second frequency band f2 as UL frequency band.

Radio resources specified with time-frequency domain can be dynamically reallocated to BS->RS, RS->MS, MS->RS, and RS->BS links by considering, for example, a DL/UL traffic load and/or a channel condition. For example, when a traffic load of a specific link is heavy, a relatively large amount of radio resources can be allocated to that link, and when a channel condition of the specific link is poor, a relatively small amount of radio resources can be allocated to that link. The dynamic reallocation of radio resources may use a control signal to notify the reallocation information. There is no limitation for a time, procedure, and method of transmitting the control signal.

The MS and the BS may be, respectively, a sub-ordinate RS and/or a super-ordinate RS in a multi-hop relay system. In addition, the first time slot t1 and the second time slot t2 may correspond to a variety of different time slots, and as long as the second time slot t2 follows the first time slot t1. The two time slots may be contiguous or be separated by a specific interval.

Figure 7:
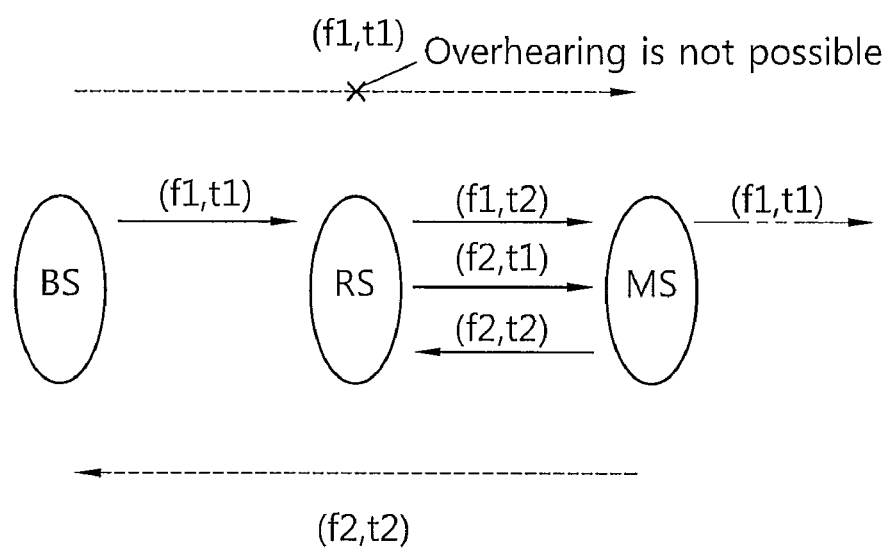
FIG. 7 shows an example of operating a resource exchange FDD system.

FIG. 7 shows an example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when downlink traffic increases, the system may perform a DL/UL resource exchange to increase capacity of an RS->MS link as shown in FIG. 7. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 7, radio resources are allocated in the same manner as in the normal state at (f1, t1), which denotes a DL frequency band f1 at a first time slot t1, and at (f1, t2) and (f2, t2) which respectively denote the DL frequency band f1 at a second time slot t2 and a UL frequency band f2 at the second time slot t2. In the abnormal state, (f2, t1), that is, the UL frequency band f2 at the first time slot t1, is assigned not to an RS->BS link but to the RS->MS link. When downlink traffic is temporarily increased, the increased downlink traffic can be effectively processed by increasing radio resources to be allocated for the RS->MS link.

Since reception is achieved at (f2, t1), the MS operating in the band switching FDD mode cannot overhear a signal transmitted by the BS to the RS at (f1, t1). Instead, the MS can transmit a signal to a third system at (f1, t1), and a signal transmitted by the MS to the RS at (f2, t2) can be overheard by the BS.

Figure 8:
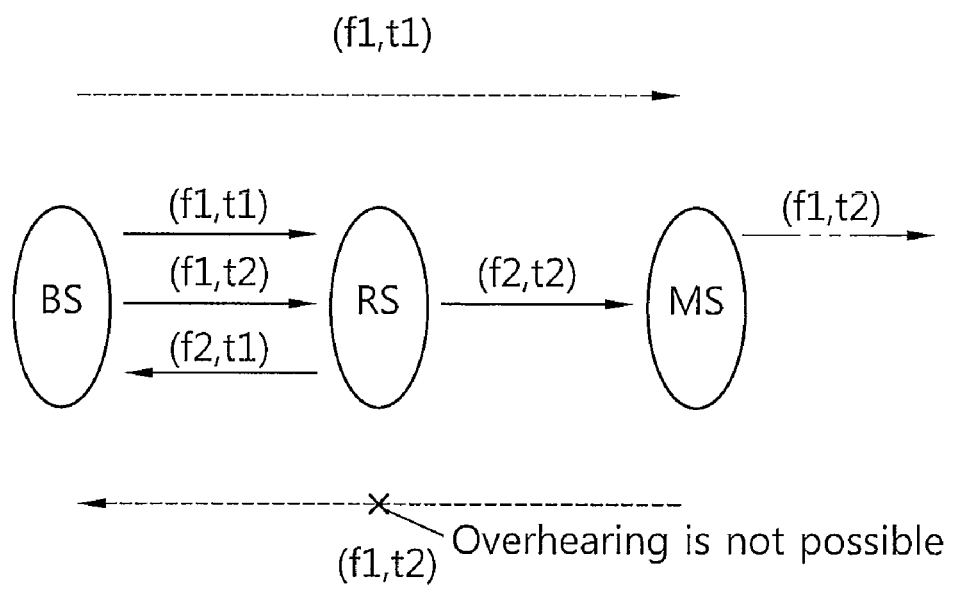
FIG. 8 shows another example of operating a resource exchange FDD system.

FIG. 8 shows another example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when downlink traffic increases, the system may perform DL/UL resource exchange to increase capacity of a BS->RS link as shown in FIG. 8. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 8, radio resources are allocated in the same manner as in the normal state at (f1, t1), and at (f2, t1).

However, in the abnormal state, (f1, t2) and (f2, t2) are assigned differently from the case of the normal state. That is, in the abnormal state, (f1, t2) is assigned not to an RS->MS link but to the BS->RS link, and (f2, t2) is assigned not to the MS->RS link but to the RS->MS link. When downlink traffic is temporarily increased, the increased downlink traffic can be effectively processed by increasing radio resources to be allocated for the BS->RS link.

Since reception is achieved at (f2, t2), the MS operating in the band switching FDD mode cannot overhear a signal transmitted by the BS to the RS at (f1, t2). Instead, the MS can transmit a signal to a third system at (f1, t2), and a signal transmitted by the BS to the RS at (f1, t1) can be overheard by the MS.

Figure 9:
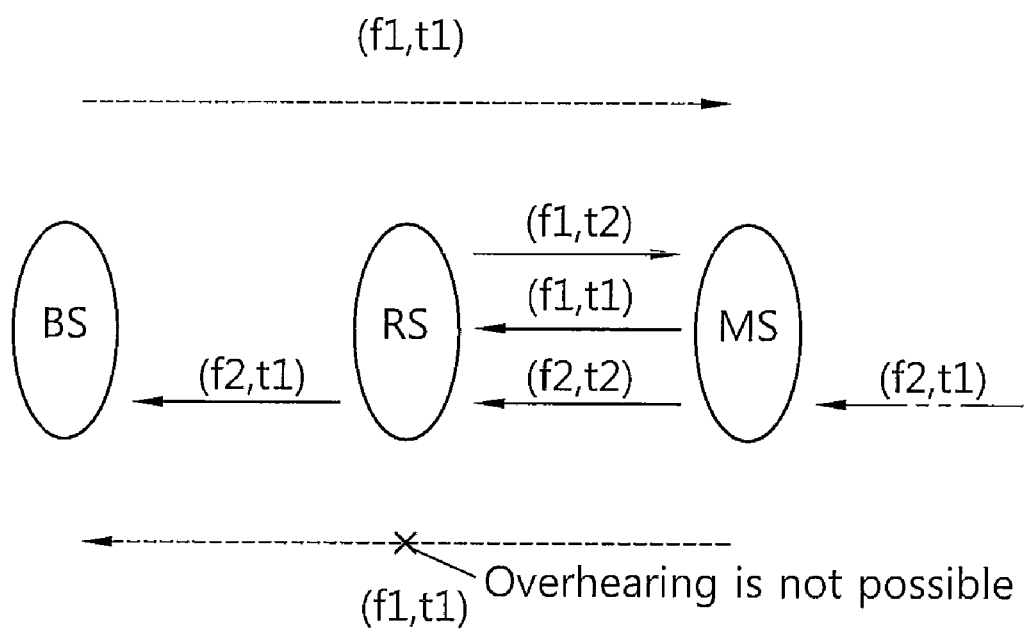
FIG. 9 shows still another example of operating a resource exchange FDD system.

FIG. 9 shows still another example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when uplink traffic increases, the system may perform DL/UL resource exchange to increase capacity of an MS->RS link as shown in FIG. 9. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 9, radio resources are allocated in the same manner as in the normal state at (f2, t1), and (12, t2). In an abnormal state, (f1, t1) is assigned not to a BS->RS link but to the MS->RS link. When uplink traffic is temporarily increased, the increased uplink traffic can be effectively processed by increasing radio resources to be allocated for the MS->RS link.

Since reception is achieved at (f2, t1), the BS cannot overhear a signal transmitted by the MS to the RS at (f1, t1). Instead, the MS can receive a signal from a third system at (f2, t1), and a signal transmitted by the BS to the RS at (f1, t1) can be overheard by the MS.

Figure 10:
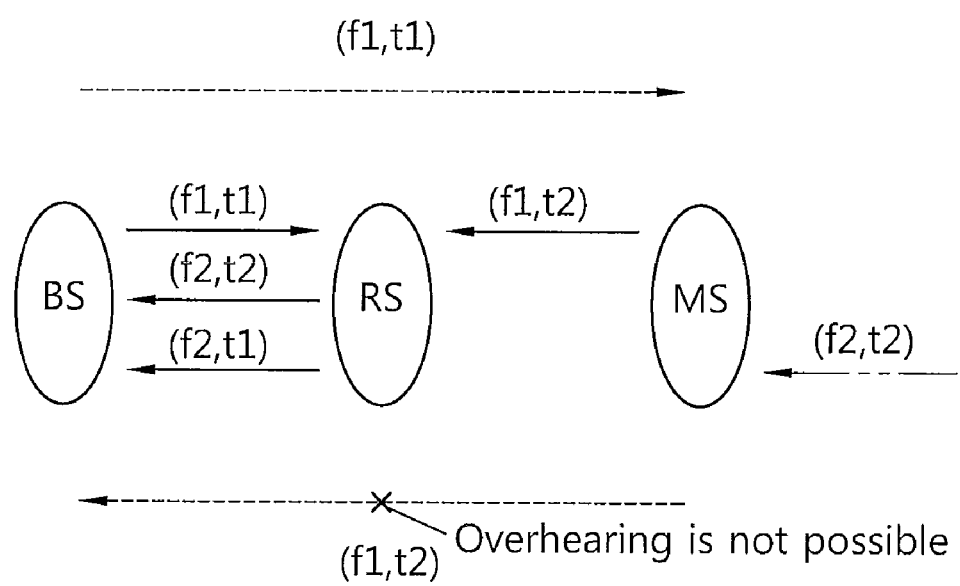
FIG. 10 shows still another example of operating a resource exchange FDD system.

FIG. 10 shows still another example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when uplink traffic increases, the system may perform DL/UL resource exchange to increase capacity of an RS->BS link as shown in FIG. 10. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 10, radio resources are allocated in the same manner as in the normal state at (f1, t1), and at (f2, W. In an abnormal state, (f1, t2) and (12, t2) are assigned differently from the case of the normal state. That is, in the abnormal state, (f1, t2) is assigned not to an RS->MS link but to an MS->RS link, and (f2, t2) is assigned not to the MS->RS link but to the RS->BS link. When uplink traffic is temporarily increased or in an equivalent case, the increased uplink traffic can be effectively processed by increasing radio resources to be allocated for the RS->BS link.

Since reception is achieved at (12, t2), the BS cannot overhear a signal transmitted by the MS to the RS at (f1, t2). Instead, the MS can receive a signal from a third system at (f2, t2), and a signal transmitted by the BS to the RS at (f1, t1) can be overheard by the MS.

Figure 11:
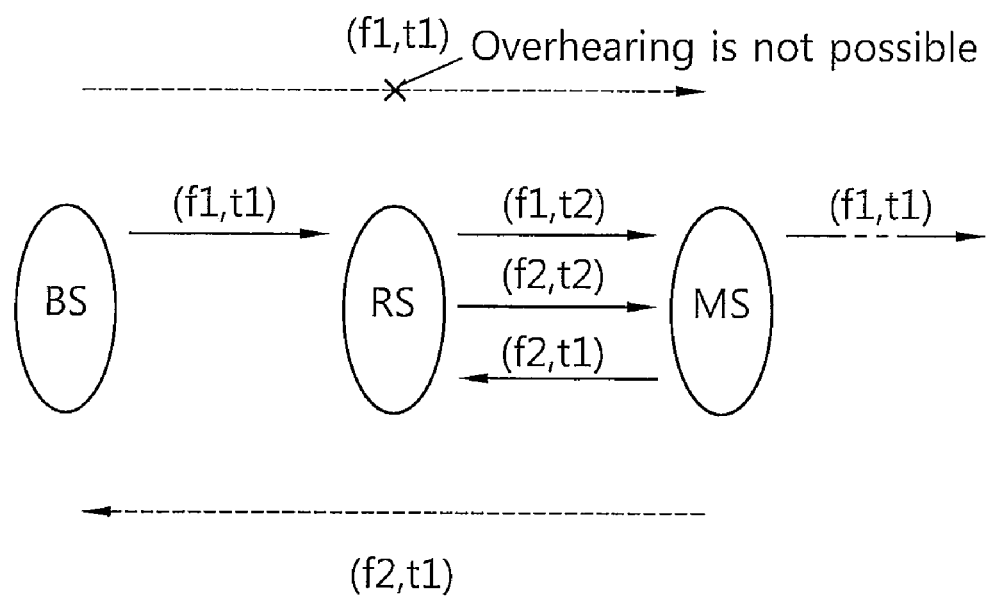
FIG. 11 shows still another example of operating a resource exchange FDD system.

FIG. 11 shows still another example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when downlink traffic increases, the system may perform DL/UL resource exchange to increase capacity of an RS->MS link as shown in FIG. 11. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 11, radio resources are allocated in the same manner as in the normal state at (f1, t1), (f2, t1), and at (f1, t2). In the abnormal state, (12, t2) is assigned not to an RS->BS link but to the RS->MS link. When downlink traffic is temporarily increased or in an equivalent case, the increased downlink traffic can be effectively processed by increasing radio resources to be allocated for the RS->MS link.

Since reception is achieved at (f2, t1), the MS operating in the dual band Tx/Rx mode cannot overhear a signal transmitted by the BS to the RS at (f1, t1). Instead, the MS can transmit a signal to a third system at (f1, t1), and a signal transmitted by the MS to the RS at (f2, t1) can be overheard by the BS.

Figure 12:
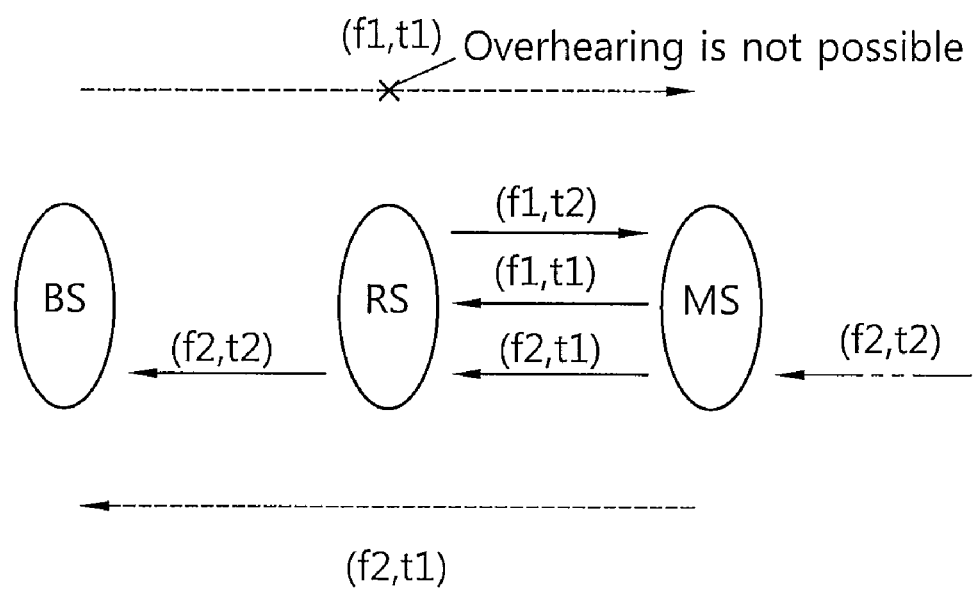
FIG. 12 shows still another example of operating a resource exchange FDD system.

FIG. 12 shows still another example of operating a resource exchange FDD system. Both a RS and a MS may support the band switching FDD mode. In a normal state, the resource exchange FDD system can operate in the band switching FDD mode as shown an embodiment of FIG. 1. In an abnormal state, for example, when uplink traffic increases, the system may perform DL/UL resource exchange to increase capacity of an MS->RS link as shown in FIG. 12. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Referring to FIG. 12, radio resources are allocated in the same manner as in the normal state at (f2, t1), (f1, t2) and (12, t2). In the abnormal state, (f1, t1) is assigned not to a BS->RS link but to the MS->RS link. When uplink traffic is temporarily increased, the increased uplink traffic can be effectively processed by increasing radio resources to be allocated for the MS->RS link.

The BS cannot overhear a signal transmitted by the MS to the RS at (f1, t1). This is because the BS supports transmission on the DL frequency band f1 but does not support reception on the DL frequency band f1. Instead, the MS can receive a signal from a third system at (f2, t2), and a signal transmitted by the MS to the RS at (f2, t1) can be overheard by the BS.

The methods, system and technique of operating the resource exchange shown in FIGS. 7-12 may be extended to a FDD system supporting multiple input multiple output (MIMO) operations.

FIG. 13 shows an example of operating a resource exchange FDD system supporting MIMO. Both a RS and a MS may support the band switching FDD mode. A dual arrow indicates transmission or reception of data using the MIMO, that is, indicates a multi-stream transmission.

Sub-figure (a) of FIG. 13 shows that a resource exchange FDD system is in a normal state. In the normal state, the resource exchange FDD system can similarly operate in the band switching FDD mode as shown an embodiment of FIG. 1 except multi-stream transmission. In an abnormal state, for example, when downlink traffic increases, the system may perform DL/UL resource exchange to increase capacity of an RS->MS link as shown in sub-figure (b) of FIG. 13. In the abnormal state, the resource exchange FDD system can similarly operate in the band switching FDD mode as shown in an embodiment of FIG. 7 except multi-stream transmission. The normal state and the abnormal state may be switched in various ways. After switching to the abnormal state, the RS (or MS or BS) may return to the normal state. Before changing its state, a BS may transmit a control signal for DL/UL resource exchange to the RS and/or the MS.

Operations associated with sub-figures (a) and (b) of FIG. 13 may be the same as those described with reference to FIG. 1 and FIG. 7 except that each station is a MIMO station. In addition, the operation of the resource exchange FDD system described with reference to FIGS. 8-12 may equally apply to the abnormal state of the resource exchange FDD system consisting of MIMO stations.

Figure 14:
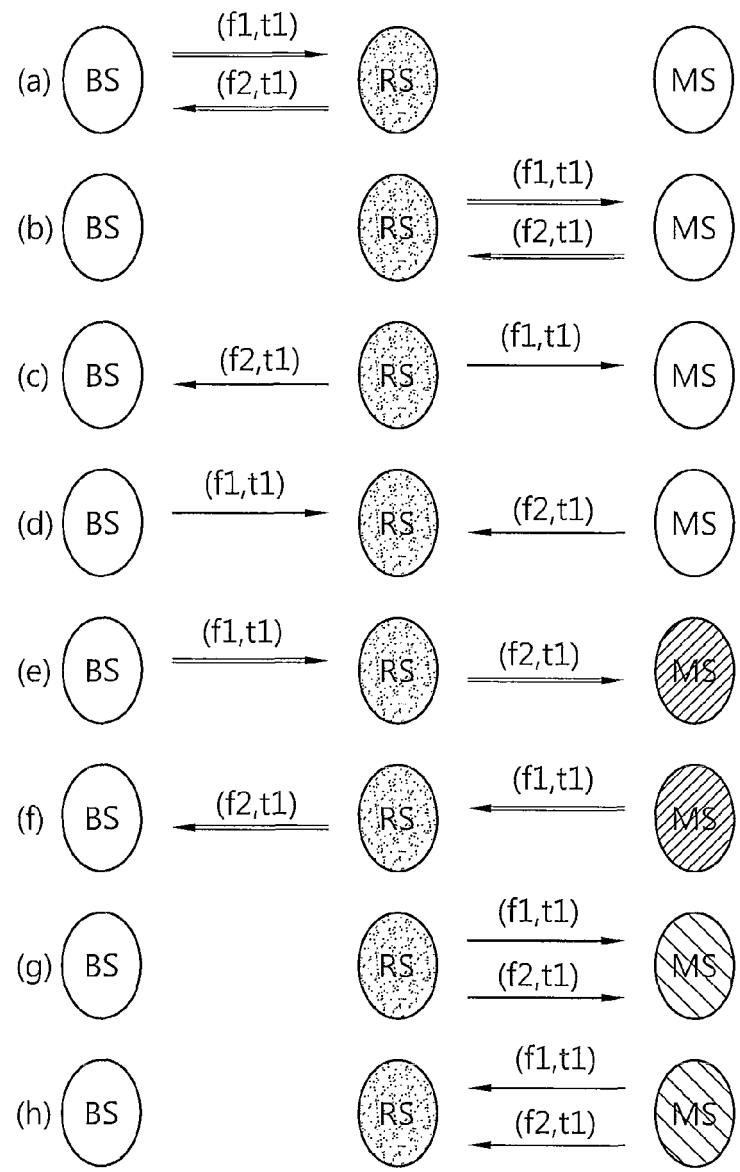
FIG. 14 is a diagram showing exemplary methods of operating a resource exchange FDD system.

FIG. 14 is a diagram showing exemplary methods of operating a resource exchange FDD system. In a resource exchange FDD system, a RS may be a station supporting the band switching FDD mode and the dual band Tx/Rx mode. A MS and/or a BS may be a legacy station or may be a station supporting the band switching FDD mode or the dual band Tx/Rx mode. The legacy station supports fixed DL/UL frequency band. In FIG. 14, the BS is always used as a legacy system. The MS may be a legacy station (in case of sub-figures (a)-(d) of FIG. 14), a station supporting the band switching FDD mode (in case of sub-figures (e) and (f) of FIG. 14), or a station supporting the dual band Tx/Rx mode (in case of sub-figures (g) and (h) of FIG. 14).

The BS, RS, and MS may support MIMO operations. The BS, RS, and MS may support single stream transmission/reception or multi-stream transmission/reception. In FIG. 14, a single arrow indicates transmission of single stream and a double arrow indicates transmission of multi-stream. However, the discrimination of the cases of using the single stream and the multi-stream is exemplary purpose only. Therefore, although sub-figure (a) of FIG. 14 shows that the multi-stream is transmitted, the single stream may also be transmitted. On the contrary, although sub-figure (c) of FIG. 14 shows that the single stream is transmitted, the multi-stream may also be transmitted.

It is also assumed in FIG. 14 that a transceiver of the RS includes two pairs of Tx/Rx radio frequency (RF) chains. However, the embodiment of the present invention is not limited thereto, and thus can also apply when the transceiver of the RS includes two or more pairs of Tx/Rx chains, and it is apparent to those skilled in the art.

Referring to FIG. 14, when the BS and the MS are both legacy stations, the RS supporting the band switching FDD mode and the dual band Tx/Rx mode supports a first operation (see sub-figure (a) of FIG. 14) in which a signal is received from the BS in a DL frequency band f1 at a first time slot t1 and a signal is transmitted to the BS in a UL frequency band f2 at the first time slot t1, a second operation (see sub-figure (b) of FIG. 14) in which a signal is transmitted to the MS in the DL frequency band f1 at the first time slot t1 and a signal is received from the MS on the UL frequency band f2 at the first time slot t1, a third operation (see sub-figure (c) of FIG. 14) in which a signal is transmitted to the MS in the DL frequency band f1 and at the same time a signal is transmitted to the BS on the UL frequency band f2, and a fourth operation (see sub-figure (d) of FIG. 14) in which a signal is received from the BS in the DL frequency band f1 and at the same time a signal is received from the MS in the UL frequency band f2.

When the BS is a legacy station and the MS is a station supporting the band switching FDD mode, the RS supporting the band switching FDD mode and the dual band Tx/Rx mode may further support a fifth operation (see sub-figure (e) of FIG. 14) in which a signal is received from the BS in the DL frequency band f1 and at the same time a signal is transmitted to the MS in the UL frequency band f2 and a sixth operation (see sub-figure (f) of FIG. 14) in which a signal is received from the MS in the DL frequency band f1 and at the same time a signal is transmitted to the BS in the UL frequency band f2.

When the BS is a legacy station and the MS is a station supporting the dual band Tx/Rx mode, the RS supporting the band switching FDD mode and the dual band Tx/Rx mode may also support a seventh operation (see the (g) of FIG. 14) in which signals are simultaneously transmitted to the MS in the DL frequency band f1 and the UL frequency band f2 and an eighth operation (see the (h) of FIG. 14) in which signals are simultaneously received from the MS in the DL frequency band f1 and the UL frequency band f2.

Figure 15:
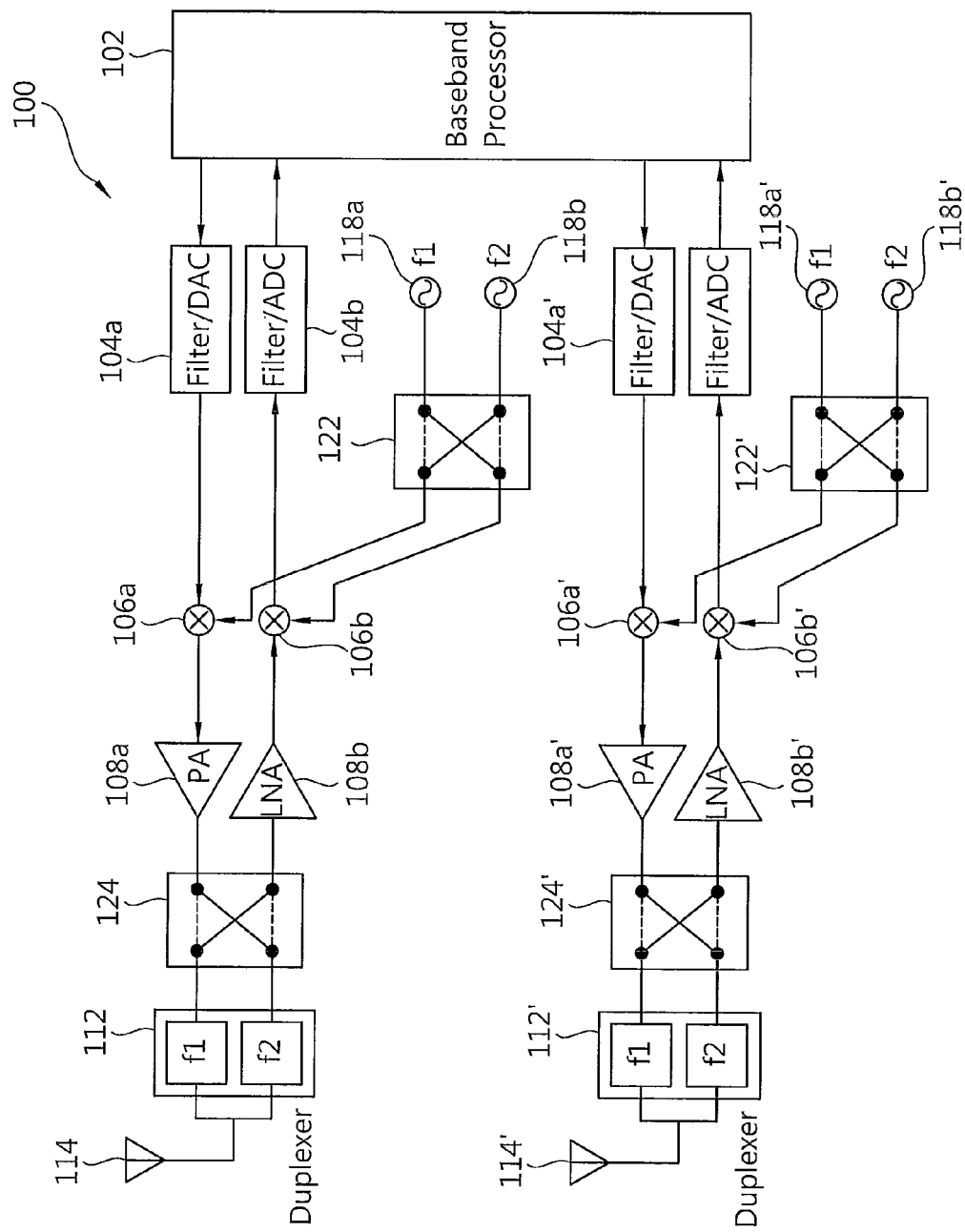
FIG. 15 is a block diagram showing an exemplary structure of a transceiver included in a RS supporting the band switching FDD mode and the dual band Tx/Rx mode.

FIG. 15 is a block diagram showing an exemplary structure of a transceiver included in a RS supporting the band switching FDD mode and the dual band Tx/Rx mode. A transceiver 100 may implements the band switching FDD mode and the dual band Tx/Rx mode shown in FIGS. 1-14. The transceiver 100 may include two pairs of RF chains. The transceiver 100 may include a baseband processor 102, first and second filters/DA converters (DACs) 104a and 104a', first and second up-convertors 106a and 106a', first and second down-convertors 106b and 106b', first and second power amplifiers (PAs) 108a and 108a', first and second low noise amplifiers (LNAs) 108b and 108b', first and second duplexers 112 and 112', first and second antennas 114 and 114', and two pairs of local oscillators 118a, 118b, 118a', and 118b'. The two pairs of the local oscillators 118a, 118b, 118a', and 118b' of FIG. 15 are shown for exemplary purposes only, and thus the first local oscillators 118a and 118b and the second local oscillators 118' and 118b' can be integrated into one element when implemented.

The transceiver 100 may further include four Tx/Rx band switches 122, 124, 122', and 124'. Among the four Tx/Rx band switches 122, 124, 122', and 124', the first and second Tx/Rx band switches 122 and 124 are respectively connected between the first or second local oscillators 118a, 118b, 118a', and 118b' and the first or second up-converters and down-convertors 106a, 106b, 106a', and 106b', and the third and fourth Tx/Rx band switches 122' and 124' are respectively connected between the first or second PAs and LNAs 108a, 108b, 108a', and 108b' and the first or second duplexers 112 and 112'. Accordingly, the transceiver 100 can perform a MIMO full duplex operation while changing a Tx band and an Rx band on a plurality of frequencies. Further, the Tx RF chains respectively coupled with the first and second antennas 114 and 114' may have identical or different operation frequencies, and as a result, the transceiver 100 can perform concurrent transmission or concurrent reception by using two bands.

The transceiver 100 including the four Tx/Rx band switches can operate according to various combinations of the band switching FDD mode and/or the dual band Tx/Rx mode of the multiple antenna system on the plurality of frequencies. More specifically, the radio transceiver 100 can flexibly support the following four operation modes depending on scheduling or opportunity. Further, if necessary, the transceiver 100 can partially perform a full duplex operation according to each operation mode to be described below by turning ON only a part of two Tx RF chains and two Rx RF chains. Therefore, the RS employing the transceiver 100 can not only support a relay based on various scenarios in the band switching FDD system but also maximize efficiency of the RS.

In the above description, the BS has been assumed to be a legacy station. If the BS is not a legacy station but a station supporting the band switching FDD mode and/or the dual band Tx/Rx mode, the aforementioned various methods and techniques between the RS and the MS can also apply between the BS and the RS. For example, in the embodiments of FIG. 1-14, the MS and the BS may be switched.

Implementations of the various techniques described herein may be implemented in digital electronic circuitry, or in computer hardware, firmware, software, or in combinations of them. Implementations may include a computer program product, i.e., a computer program tangibly embodied in a machine-readable storage device for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program so as to perform corresponding functions by operating on input data and generating an output. Method steps also may be performed by, and an apparatus may be implemented as, special purpose logic circuitry, e.g., an FPGA (field programmable gate array) or an ASIC (application-specific integrated circuit).

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A wireless communication system, comprising: a relay station (RS) configured to operate in a band switching frequency division duplex (FDD) mode in which a transmit (Tx) frequency and a receive (Rx) frequency are switched between a first frequency band and a second frequency band,
    wherein the Rx frequency is set to the first frequency band during a first time interval and the Tx frequency is set to the second frequency band during the first time interval,
    wherein the Rx frequency is set to the second frequency band during a second time interval and the Tx frequency is set to the first frequency band during the second time interval, and
    wherein the first time interval is followed by the second time interval, and the second frequency band is different from the first frequency band;
    a first station configured to transmit a first signal in the first frequency band during the first time interval via the RS operating in the band switching FDD mode, receive a second signal in the second frequency band different from the first frequency band during the first time interval via the RS, and communicate in a half duplex mode or a full duplex mode; and
    a second station configured to receive the first signal in the first frequency band during the second time interval via the RS, transmit a third signal in the second frequency band during the second time interval via the RS, and communicate in the half duplex mode or the full duplex mode; and switching the second frequency band associated with data transmission to the source station into the first frequency band associated with data transmission to the destination station after receiving the third signal.

2. The wireless communication system of claim 1, wherein the band switching FDD mode includes switching multiplexing schemes when different multiplexing schemes are used in the first frequency band and the second frequency band.

3. The wireless communication system of claim 1, wherein the RS is further configured to operate in a dual band transmit (Tx)/receive (Rx) mode in which concurrent signal transmissions or concurrent signal receptions occur in the first frequency band or the second frequency band.

4. The wireless communication system of claim 1, wherein the second station is configured to directly receive the first signal, and to combine the relayed first signal with the directly received first signal.

5. The wireless communication system of claim 1, wherein the first station is configured to directly receive the third signal, and to combine a relayed third signal with the directly received third signal.

6. The wireless communication system of claim 1, wherein the first station is a base station (BS) and the second station is a mobile station (MS).

7. The wireless communication system of claim 1, wherein the first station is a mobile station (MS) and the second station is a base station (BS).

8. A relay station for wirelessly relaying communication between a source station and a destination station, comprising:
    a transceiver configured to operate in a band switching frequency division duplex (FDD) mode and a dual band transmit/receive (Tx/Rx) mode,
    wherein, in the band switching FDD mode, a transmit (Tx) frequency and a receive (Rx) frequency are switched between a first frequency band and a second frequency band different from the first frequency band,
    wherein the Rx frequency is set to the first frequency band during a first time interval and the Tx frequency is set to the second frequency band during the first time interval,
    wherein the Rx frequency is set to the second frequency band during a second time interval and the Tx frequency is set to the first frequency band during the second time interval,
    wherein the first time interval is followed by the second time interval, wherein the transceiver is further configured to
    receive a first signal from the source station in the first frequency band during the first time interval,
    transmit a second signal to the source station in the second frequency band during the first time interval,
    transmit the first signal to the destination station in the first frequency band during the second time interval, and
    receive a third signal from the destination station in the second frequency band during the second time interval, and
    wherein, the transceiver further configured to switch from the band switching mode to the dual band Tx/Rx mode; and, in the dual band Tx/Rx mode, concurrent transmission or concurrent reception is achieved in the first frequency band and the second frequency band between the relay station and the source station, or between the relay station and the destination station.

9. The relay station of claim 8, wherein the transceiver is configured to change operation modes from the band switching FDD mode to the dual band Tx/Rx mode or from the dual band Tx/Rx mode to the band switching FDD mode.

10. The relay station of claim 8, wherein the source station is a base station (BS) and the destination station is a mobile station (MS).

11. The relay station of claim 8, wherein the source station is a mobile station (MS) and the destination station is a base station (BS).

12. The relay station of claim 8, wherein at least one of the source station and the destination station is configured to support the band switching FDD mode or the dual band Tx/Rx mode.

13. A method of relaying information via a relay station in a wireless communication system, the method comprising:
   the relay station (RS) configured to operate in a band switching frequency division duplex (FDD) mode in which a transmit (Tx) frequency and a receive (Rx) frequency are switched between a first frequency band and a second frequency band,
   receiving a first signal in the first frequency band from a source station during a first time interval; transmitting a second signal in the second frequency band to the source station during the first time interval,
   wherein the second frequency band is different from the first frequency band;
   relaying the first signal in the first frequency band to a destination station during a second time interval,
   wherein the first time interval is followed by the second time interval;
   receiving a third signal in the second frequency band from the destination station during the second time interval; and
   switching the second frequency band associated with data transmission to the source station into the first frequency band associated with data transmission to the destination station after receiving the third signal.

* * * * *